Patented July 15, 1924.

1,501,587

UNITED STATES PATENT OFFICE.

CHARLES A. DOREMUS, OF NEW YORK, N. Y., ASSIGNOR TO TITANIUM PIGMENT COMPANY, INC., OF NEW YORK, N. Y., A CORPORATION OF MAINE.

TITANIC OXIDE CONCENTRATE AND METHOD OF PRODUCING THE SAME.

No Drawing.　　Application filed November 8, 1922. Serial No. 599,656.

*To all whom it may concern:*

Be it known that I, CHARLES A. DOREMUS, a citizen of the United States, and a resident of the city of New York, in the State of New York, have invented a new and useful Titanic Oxide Concentrate and Method of Producing the Same, of which the following is a specification.

My invention relates to the treatment of materials (for example titaniferous, or particularly titaniferous-ferruginous ores containing ilmenite) to separate their titanic from other therein, undesired, substances and produce final products consisting more preponderatingly than heretofore of titanium oxide of superior quality for pigment and other purposes and characterized by presence, or at least not less than traces, of potassium.

The objects of my invention comprise provision of a more effective and economical process for obtaining said products of greater purity or freedom from undesired substances, and having more desirable properties for certain uses, such as pigments, than heretofore; my said process resulting also incidentally in more important recoveries of therein employed reagents and obtainment of useful by-products.

I obtain these objects by my present method or process, an example of which is as follows:

For example, I take, as the material to be treated, a titaniferous-ferruginous, or ilmenite, ore of the following composition;

| | |
|---|---|
| Titanium oxide | 53.66 |
| Ferrous oxide | 17.09 |
| Ferric oxide | 18.68 |
| Zirconia | 0.94 |
| Alumina | 1.12 |
| Silica | 3.80 |
| Calcium oxide | 0.72 |
| Manganese oxide | 1.36 |
| Phosphorus anhydride | 0.84 |
| Loss on ignition | 0.70 |
| | 98.91 |

I digest this ore in aqueous hydrofluoric acid (preferably 20% HF) having discovered that such constituents of such an ore as are most important for my purposes are thereby more readily and generally dissolved than by other treatments.

I preferably mill the ore to say about 200 mesh and add it, say 100 pounds thereof, to between 550 and 600 pounds (say 580 pounds) of the aqueous hydrofluoric acid and, while agitating it, heat the charge, preferably by live steam, in any suitable container, or tank.

After the digestion has been thus continued for a convenient period, I withdraw the undecomposed ore, as by filtration, to be subsequently similarly further treated if desired, and I oxidize the filtrate containing fluorides; for example by adding thereto hydrogen peroxide whereby certain of its ferrous constituents are, as is important for my purposes, converted into ferric.

I next add, preferably accompanied by stirring, an aqueous solution of an alkali, preferably a potassium compound, as for example potassium hydroxide. This addition serves, in that case, mainly to provide the potassium necessary for the formation of potassium fluotitanate, and, to the extent that silicon and zirconium are present, potassium fluosilicate and potassium fluozirconate, all three of these potassium compounds then appearing as white crystalline precipitates in the cold.

I then withdraw and collect these precipitates and wash them.

My said fluorine products I treat with hot water, thereby therein dissolving the potassium fluotitanate crystals, and thus enabling me as by filtration to withdraw the potassium fluotitanate from the comparatively insoluble potassium fluosilicate and fluozirconate crystals.

Should further purification of my said potassium-fluorine-titanium products be at any stage indicated, I preferably redissolve them in fresh water, and allow what is capable of so doing to recrystallize, thereby promoting separation of the titanic compounds from such therewith still associated impurities as remain in solution.

To my resulting filtrate, or solution, containing potassium fluotitanate, I add, as a precipitant, potassium hydroxide to production of a precipitate of titanium hydroxide.

Finally, my titanium hydroxide obtained as above described, I wash, and thereafter calcine, to obtain my final product consisting essentially of titanium oxide and containing also some, or if only traces of, potassium.

Incidentally the potassium fluoride, if any, remaining in the solution I treat, if desired, by such well known methods as to obtain therefrom potassium hydroxide or hydrofluoric acid for repeated use in my said process or otherwise, and similarly I treat the above referred to potassium fluosilicate and potassium fluozirconate products of my process so as to recover their fluorine contents for future use, while the resulting silica and zirconia are also valuable for certain purposes.

Furthermore, I treat, when desired, my above described ferric fluoride solution with potassium hydroxide to production of ferric hydroxide which is of value for certain purposes and uses, and I also, at the same time, thus obtain a solution of potassium fluoride, which I treat with calcium hydroxide to production of potassium hydroxide, and calcium fluoride, which are similarly of value; it being evident, for example, that such calcium fluoride can be used either to regenerate the hydrofluoric acid employed in my said process, or sold commercially.

And, should I desire to produce ferric chloride from my said ferric fluoride solution, I add to it calcium chloride in equivalent amount obtaining as products insoluble calcium fluoride and also ferric chloride which remains in solution.

While in my process I prefer to use only one alkali compound, namely potassium hydroxide, I regard it as practicable to use other alkali compounds such as ammonium hydroxide, or ammonium carbonate, at some stages; as, for example, in decomposing the potassium fluotitanate with the precipitation of titanium hydroxide. I therefore do not limit myself to the use of potassium hydroxide, or potassium compounds, except in so far as their use is necessary for the production of potassium fluotitanate, fluosilicate, and fluozirconate.

It follows that my said process for obtaining titanic oxide concentrates can be operated by the aid of comparatively simple and inexpensive apparatus, with relatively small labor and fuel expenditure, with important recoveries of materials and reagents for reuse, or as by-products, and production of a superior final principal product of concentrated titanium oxide distinguishable from other analogous products, or pigments, by its content of potassium, and otherwise.

Having now described my invention, what I claim as new and desire to secure by Letters Patent is the following, viz:

1. In the treatment of titaniferous-ferruginous materials to extract therefrom titanic oxide the steps which consist in digesting said materials in hydrofluoric acid, withdrawing the resulting solution from undecomposed portions and treating it to production of titanic oxide.

2. The method of obtaining, from titaniferous-ferruginous ore, a product consisting essentially of titanic oxide which comprises digesting the comminuted ore in aqueous hydrofluoric acid, withdrawing from the resulting solution undecomposed portions of the ore as by filtration, and thereafter treating the filtrate and derivatives thereof to production therefrom of said essentially titanic oxide product.

3. The method of treating titaniferous material to separate its titanic from other therein substances which comprises digesting said material by aid of hydrofluoric acid, withdrawing the resulting solution, oxidizing it, and adding thereto potassium hydroxide.

4. The method of treating titaniferous material to separate its titanic from other therein substances which comprises digesting said material by aid of hydrofluoric acid, withdrawing the resulting solution, treating it with hydrogen peroxide, and adding thereto potassium hydroxide.

5. The method of treating titaniferous material to separate its titanic from other therein substances which comprises digesting said material by aid of hydrofluoric acid, withdrawing the resulting complex solution, and treating it with potassium hydroxide to precipitation of potassium fluotitanate.

6. The method of treating titaniferous material to separate its therein titanic from other therein substances which comprises digesting said material by aid of hydrofluoric acid, withdrawing the resulting complex solution, treating it with potassium hydroxide to precipitation of potassium fluotitanate and of other compounds, withdrawing the precipitates, and treating them with water to solution of the potassium fluotitanate.

7. The method of treating titaniferous material to separate its titanic from other therein substances which comprises digesting said material by aid of hydrofluoric acid, withdrawing the resulting complex solution, treating it with potassium hydroxide to precipitation of potassium fluotitanate and of other compounds, withdrawing said precipitates, washing them, treating them with hot water to solution of the potassium fluotitanate, and adding to the last mentioned solution potassium hydroxide to precipitation of titanium hydroxide.

8. The method of treating titaniferous material to separate its titanic from other therein substances which comprises digesting said material by aid of hydrofluoric acid, withdrawing the resulting complex solution, treating it with potassium hydroxide to precipitation of potassium fluotitanate and of other compounds, withdrawing said precipitates, washing them, treating them with hot water to solution of the potassium fluotitanate, adding to the last mentioned solution potassium hydroxide to precipitation of titanium hydroxide, and calcining it.

9. The method of treating titaniferous material to separate its titanic from therein other substances which comprises digesting said material by aid of hydrofluoric acid, withdrawing the resulting complex solution, treating it with potassium hydroxide to precipitation of crystalline potassium fluotitanate and of other compounds, withdrawing said precipitates, washing them, treating them with hot water to solution of the potassium fluotitanate, separating the solution from the insoluble compounds, allowing the potassium fluotitanate to recrystallize from said solution, withdrawing the crystals so obtained, dissolving them in water, and adding to the solution so obtained potassium hydroxide to precipitation of titanium hydroxide.

10. In the treatment of titaniferous ore to separate its titanic from other therein substances, the step which consists in treating said ore with hydrofluoric acid to production of fluorine compounds of titanium.

11. In the treatment of titaniferous-ferruginous ore, the steps which consist in treating said ore with hydrofluoric acid to production of fluorine compounds of titanium and ferrous compounds of elements other than titanium and thereafter transforming said ferrous compounds into ferric compounds.

12. In the treatment of titaniferous material to separate its titanic from other therein contained substances, the steps which consist in treating said material with a fluorine compound to production of a solution containing fluorine compounds of titanium, and adding to said solution a potassium compound to production therein of potassium fluotitanate.

13. The method of treating titaniferous material to separate its therein titanic from other substances which comprises digesting said material by aid of hydrofluoric acid and adding an alkali compound to the resulting solution.

14. In the treatment of titaniferous-ferruginous ore, the steps which consist in treating said ore with hydrofluoric acid to production of fluorine compounds of titanium and ferrous compounds or iron and transforming said ferrous into ferric compounds of iron.

CHARLES A. DOREMUS.

Witness:
WILLIAM J. HOPKINS.